US009131541B2

(12) United States Patent
Nordh et al.

(10) Patent No.: US 9,131,541 B2
(45) Date of Patent: Sep. 8, 2015

(54) METHODS OF CONTROLLING COOLING IN A MICROWAVE HEATING APPARATUS AND APPARATUS THEREOF

(75) Inventors: Ulf Nordh, Norrkoping (SE); Hakan Carlsson, Norrkoping (SE); Olle Niklasson, Finspong (SE); Fredrik Hallgren, Kolmarden (SE)

(73) Assignee: Whirlpool Corporation, Benton Harbor, MI (US)

( * ) Notice: Subject to any disclaimer, the term of this patent is extended or adjusted under 35 U.S.C. 154(b) by 803 days.

(21) Appl. No.: 13/331,926

(22) Filed: Dec. 20, 2011

(65) Prior Publication Data

US 2012/0152937 A1 Jun. 21, 2012

(30) Foreign Application Priority Data

Dec. 21, 2010 (EP) .................................... 10196131

(51) Int. Cl.

| | |
|---|---|
| ***H05B 6/68*** | (2006.01) |
| ***H02M 3/335*** | (2006.01) |
| ***H05B 6/64*** | (2006.01) |
| ***H05B 6/66*** | (2006.01) |

(52) U.S. Cl.

CPC ................ *H05B 6/642* (2013.01); *H05B 6/666* (2013.01); *H05B 6/68* (2013.01)

(58) Field of Classification Search

CPC ........... H05B 6/642; H05B 6/68; H05B 6/666

USPC ......... 219/702, 696, 704, 709, 710, 716, 761, 219/717, 748, 707, 679, 750; 363/24, 133, 363/21.29, 56.09

See application file for complete search history.

(56) References Cited

U.S. PATENT DOCUMENTS

| | | | | |
|---|---|---|---|---|
| 5,268,547 | A * | 12/1993 | Bessyo et al. | 219/716 |
| 2002/0027135 | A1 | 3/2002 | Fagrell et al. | |
| 2002/0053565 | A1 * | 5/2002 | Lee et al. | 219/757 |

FOREIGN PATENT DOCUMENTS

| | | | | |
|---|---|---|---|---|
| EP | 1643641 | A2 | | 4/2006 |
| EP | 2200402 | A1 | | 6/2010 |
| EP | 2365733 | A1 | * | 9/2011 |
| WO | 00/52970 | A1 | | 9/2000 |
| WO | 2010098038 | A1 | | 9/2010 |

OTHER PUBLICATIONS

European Search Report for Corresponding EP 10196131.6, Nov. 22, 2011.

* cited by examiner

*Primary Examiner* — Quang Van

(57) ABSTRACT

A microwave heating apparatus and methods of controlling cooling of a microwave heating apparatus are provided. The microwave heating apparatus typically includes a microwave source for generating microwaves, a cooling unit for cooling the microwave source and a control unit. According to one embodiment, the control unit is configured to determine the efficiency of the microwave source and then to control the cooling based on the determined efficiency. The methods and the microwave heating apparatuses of the present invention are advantageous with respect to energy consumption.

11 Claims, 3 Drawing Sheets

METHODS OF CONTROLLING COOLING IN A MICROWAVE HEATING APPARATUS AND APPARATUS THEREOF

CROSS-REFERENCE TO RELATED APPLICATION

This application claims priority to European Application No. EP10196131.6, filed on Dec. 21, 2010, entitled METHODS OF CONTROLLING COOLING IN A MICROWAVE HEATING APPARATUS AND APPARATUS THEREOF, the disclosure of which is hereby incorporated by reference in its entirety.

BACKGROUND OF THE INVENTION

Microwave heating is a well known technique for rapidly cooking or reheating an item, e.g. food, by using microwaves. In a microwave oven, the microwave energy is provided by a microwave source, usually a magnetron, and then fed to a cavity for heating the item. A microwave oven comprising a magnetron (e.g. a magnetron powered with a "regular" mains high voltage transformer or an inverter-powered magnetron) normally includes a high-voltage transformer for driving the microwave source. Further, cooling of the microwave source is normally necessary for the output power of the microwave source to be maximal since, under operation, heat is generated by the microwave source.

In household microwave ovens, the cooling system is usually based on forced air generated by a fan and guided to the magnetron via various forms of air channels. Prior art cooling systems are often static in that the motor of the cooling system is run at a constant speed throughout an operation cycle. The cooling level of the cooling system is normally determined by identifying the operating scenario that requires a specific airflow through the magnetron (the cooling system being usually designed using the so called normal test, wherein the cooling is optimized for a 1000 g water load). The cooling system is then set at the highest cooling level required for the particular operating scenario. Drawbacks of prior art cooling systems for microwave ovens are that a rather high level of noise is produced and that the energy consumption is not optimized.

SUMMARY OF THE INVENTION

Generally, it is an object of the present invention to provide a microwave heating apparatus with an improved control of the cooling.

According to an aspect of the present invention, a method of controlling cooling of a microwave source in a microwave heating apparatus is provided. The method includes the step of determining the efficiency of the microwave source and the step of controlling the cooling based on the determined efficiency.

According to another aspect of the present invention, a microwave heating apparatus is provided. The microwave heating apparatus includes a microwave source for generating microwaves, a cooling unit for cooling the microwave source and a control unit. The control unit is configured to determine the efficiency of the microwave source and control the cooling unit based on the determined efficiency.

The present invention makes use of an understanding that cooling in a microwave heating apparatus may be controlled based on the efficiency of the microwave source. As compared to, e.g., prior art microwave ovens based on a static cooling system set at the highest required airflow throughout an operation cycle, the present invention is advantageous in that it provides a microwave heating apparatus with improved and dynamic control of the cooling. Further, an improved control of the cooling contributes positively to the overall energy efficiency of the microwave heating apparatus as a whole. A reduction of the cooling when it is determined that the microwave source operates at high efficiency will reduce the energy consumption of the microwave heating apparatus.

Further, as compared to prior art devices wherein control of the cooling may be based on e.g. the power output of the microwave source or the temperature at or near the microwave source, the present invention is advantageous in that a more accurate and sensitive control of the cooling is provided. In particular, controlling the cooling with respect to the efficiency of the microwave source is more sensitive in that any variation in efficiency is more rapidly detected than e.g. a change in temperature. Further, in particular for microwave ovens that include an inverter-powered magnetron, controlling the cooling with respect to the efficiency of the microwave source is more accurate than e.g. a control with respect to the output power level (wherein the cooling is increased if the output power level is increased) since an increase in output power level may in fact result in a higher efficiency and thereby may allow a reduction of the cooling or at least a lower demand for cooling than expected in relation to the increase in output power.

The present invention is also advantageous in that, by regulating the cooling unit (e.g. by regulating the speed of a motor activating a fan of the cooling unit) as a function of the microwave source efficiency (or magnetron operating characteristics if the microwave source is a magnetron), the overall noise level produced by the microwave heating apparatus is improved (and preferably optimized). In microwave ovens, in which space constraints quite often limit the degrees of freedom when designing the air guiding system of the cooling system, the noise generated by the cooling system is often higher than wanted due to restrictions in the air channel size and geometry. With the present invention, the overall noise can be reduced in that the cooling will only be increased if needed. In particular, the cooling will be decreased (or lower) if it is determined that the microwave source operates with high efficiency (i.e. in the sink phase if the microwave source is a magnetron).

Further, the present invention is advantageous in that the cooling of the microwave source is controlled depending on dynamical changes occurring in the microwave heating apparatus. Indeed, the efficiency of the microwave source is dependent on the impedance of a system defined by the microwave source, the transmission line and the cavity. In its turn, the impedance of such a system is dependent on a number of parameters such as the form, size and phase of a load arranged in the cavity, the form and size of the transmission line and the form and size of the cavity. In particular, the impedance may vary because of a change in size, form or phase of the load like at a transformation from frozen to thawed (due to the microwave heating). With the present invention, by monitoring or determining the efficiency of the microwave source, it is thus possible to control the cooling of the microwave source while taking into account any changes occurring in the load (change in size/geometry or change in temperature which alters the dielectric data of the load). In contrast, in prior art microwave ovens, the cooling of the microwave source is unaltered even if the load changes. Further, with the present invention, it is possible to control the cooling because of changes occurring in the microwave source, e.g. a magnetron, such as a change of the anode current or a change in anode temperature.

The control of the cooling in the microwave heating apparatus of the present invention is therefore more flexible. In particular, the cooling of the microwave source can be adapted to and optimized for any kind of loads (or any kind of food categories) arranged in the cavity.

The microwave source may be a magnetron such as e.g. a magnetron powered with a "regular" main high voltage transformer or an inverter-powered magnetron.

It will be appreciated that the cooling unit of the microwave heating apparatus may primarily be designed to cool down the microwave source (e.g. a magnetron) but may also be designed to cool down other parts, in particular any electric components, of the microwave heating apparatus that are directly adjacent or near the microwave source. In this respect, it will be appreciated that the microwave source might withstand (with respect to operation or functioning) lower cooling temperatures than some electric components. Thus, if the cooling system is intended to cool other components than the microwave source, the cooling system is preferably controlled not to cool down at a temperature lower than the minimal temperature at which these components can operate.

The control unit may for example be configured to control the speed of a motor of a fan arranged in the cooling unit for cooling the microwave source.

According to an embodiment, the method may further include the steps of detecting the temperature of the microwave source and calculating a temperature time derivative based on, in part, the detected temperature. The efficiency of the microwave source is then determined based on the calculated temperature time derivative. For this purpose, the microwave heating apparatus may comprise a sensor for detecting the temperature of the microwave source and calculating means (or computing means), which can be a microprocessor or code stored within the memory system of a computer containing a processor where the code is used for calculating the temperature time derivative. In the present embodiment, the efficiency of the microwave source is determined via the temperature time derivative, wherein a high temperature time derivative indicates that the microwave source operates at a low efficiency and vice versa. Thus, an increase of the temperature time derivative would then result in an increased cooling in the microwave heating apparatus. As mentioned above, the present embodiment is advantageous in that the control of the cooling is more sensitive as compared to a control of cooling based on absolute temperature values since any variation in temperature time derivative (i.e. of the microwave source efficiency) is more rapidly detected.

Further, it will be appreciated that the microwave source may be adapted to feed microwaves to a cavity of the microwave heating apparatus via a transmission line.

According to an aspect, the method may further include the steps of measuring the power of microwaves transmitted from the microwave source, receiving operational data indicative of the power supplied to the microwave source and determining the efficiency of the microwave source based on the measured power of the transmitted microwaves and the received operational data. The present embodiment provides an alternative way of determining the efficiency of the microwave source. In the present embodiment, the efficiency of the microwave source may be evaluated or determined based on measurement, or monitoring, of the power level of the microwaves transmitted (in the transmission line) from the microwave source to the cavity and based on operational data indicative of the power supplied to the microwave source.

According to an aspect, the efficiency of the microwave source is a function of the ratio between the measured power of the transmitted microwaves and the power supplied to the microwave source. In particular, if the microwave source is a magnetron, the operational data is the anode current of the magnetron. The ratio between the measured power of the transmitted microwaves and the anode current is indeed representative of the efficiency of the microwave source, wherein a high ratio (and in particular the highest ratio) corresponds to a high efficiency of the microwave source (i.e. the sink phase for a magnetron) and a low or lower ratio correspond to a low or lower efficiency (i.e. the anti-sink phase for a magnetron). Advantageously, the cooling may be decreased if the ratio is high (or if the ratio increases) i.e. if the microwave source, being a magnetron, operates in the so-called sink phase (or tend to operate in the sink phase). Similarly, the cooling may be increased if the magnetron is in anti-sink phase or tend to operate in anti-sink phase (wherein the ratio is low).

According to an aspect, the method may then further comprise the step of measuring the power of microwaves reflected back to the microwave source. The cooling is then controlled based on the determined efficiency of the microwave source and the measured power of the reflected microwaves. For this purpose, the microwave heating apparatus may further include an additional measuring device capable of measuring the power of microwaves, typically a directional coupler, for measuring the power of the reflected microwaves. In the present embodiment, the cooling of the microwave source may be controlled based on both the power level of the microwaves transmitted from the microwave source to the cavity and the power level of the microwaves reflected back towards the microwave source. The power level of the reflected microwaves is generally representative of the amount of microwaves absorbed by the cavity and, in particular, a load arranged in the cavity. The measurements of the power level of the reflected microwaves are then representative of the heating efficiency of the microwave heating apparatus. A decrease in heating efficiency may then indicate an increase of the amount of microwaves reflected back towards the microwave source, which normally would induce an increase in temperature in the microwave source and thus require an increase in cooling. The present embodiment is thus advantageous in that the cooling of the microwave source is controlled with respect to both the efficiency of the microwave source and the heating efficiency of the microwave heating apparatus. Based on information about both types of efficiencies, the control of the cooling is thus even more accurate and dynamic, thereby further improving the energy consumption and/or even the noise level of the cooling system or unit.

It will be appreciated that the additional measuring devices such as a directional coupler may be provided as an additional function of the measuring device such as a directional coupler adapted to measure the power of the transmitted microwaves or as a separate unit specifically dedicated to the measurement of the power level of the reflected microwaves. For example, the measuring device and the additional measuring device may both be a directional coupler, i.e. a single entity, adapted to separately measure the power of the transmitted microwaves and the power of the reflected microwaves. The measuring device, typically a directional coupler, typically has the capability of measuring the forward wave in the transmission line (coming from the source and the reflected wave (reflection from the applicator cavity).

According to an aspect, the control unit may be configured to increase the cooling to at least a first level if the microwave source is determined to operate in anti-sink phase and to decrease the cooling to at least a second lower level if the microwave source is determined to operate in sink phase, which is an example for achieving a more energy efficient cooling in the microwave heating apparatus. It will be appreciated, however, that more than two levels (which might e.g. correspond to two different speeds of a motor controlling a fan of the cooling unit) of cooling may be used. Similarly, a large number of thresholds may be used for categorizing the efficiency of the microwave source (rather than only categorizing with respect to “sink phase” or “anti-sink phase” for a magnetron) such that a smoother control of the cooling is provided.

According to another aspect of the present invention, a method of controlling cooling of a microwave source in a microwave heating apparatus is provided. The microwave heating apparatus includes a transmission line via which microwaves generated by the microwave source are transmitted to a cavity. The method includes the steps of measuring the power of microwaves reflected back to the microwave source and the step of controlling the cooling based on the measured power of the reflected microwaves.

According to this aspect of the present invention, the power level measured for the reflected microwaves may therefore determine how the cooling of the microwave source is to be controlled and, in particular, whether the cooling is to be increased. As mentioned above, the measurements of the power level of the reflected microwaves are representative of the heating efficiency of the microwave heating apparatus, wherein an increase of the amount of microwaves reflected back towards the microwave source indicates a decrease in heating efficiency, which normally induces an increase in temperature at or in the microwave source and thus requires an increase in cooling. It is thus considered that the cooling in the microwave heating apparatus may be based only on the heating efficiency, as determined by the power level of microwaves reflected back towards the microwave source. Such an implementation is also advantageous in that the control of the cooling is more accurate and dynamic than in prior art microwave ovens, thereby improving the energy consumption and/or even the noise level usually induced by the cooling.

It will be appreciated that embodiments specifically described with reference to the aspects of the present invention may also be applicable for the method(s) according to the present invention, in particular with respect to the regulation of the cooling by the cooling unit (such as the number of thresholds or levels of cooling).

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The present invention relates to the field of microwave heating, and in particular to methods for controlling cooling in a microwave heating apparatus.

Figure 1:
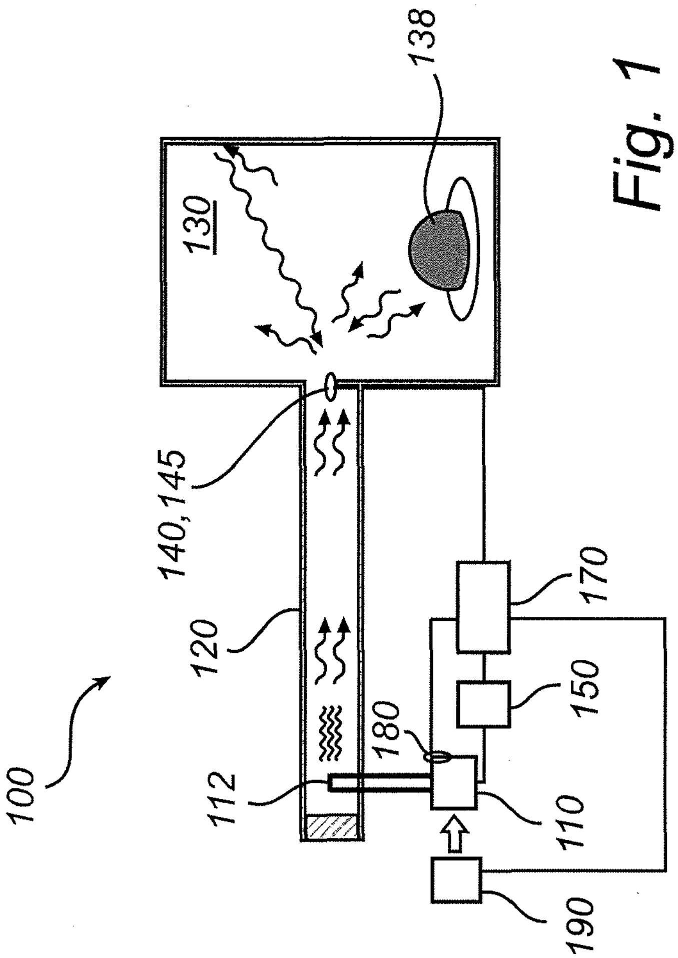
FIG. 1 schematically shows a microwave heating apparatus according to an embodiment of the present invention.

With reference to FIG. 1, there is shown a schematic view of a microwave heating apparatus according to an embodiment of the present invention.

The microwave heating apparatus 100 comprises a microwave source 110 (e.g. a magnetron), a transmission line 120 and a cavity 130. The microwave source 110 is arranged at a first end, or extremity, of the transmission line 120 while the cavity 130 is arranged at a second end, opposite to the first end, of the transmission line 120. The microwave source 110 is adapted to generate microwaves, e.g. via an antenna 112, and the transmission line 120 is configured to transmit the generated microwaves 112 from the (antenna 112 of the) microwave source 110 to the cavity 130.

The microwave heating apparatus further includes a cooling unit 190 for cooling the microwave source 110 (as schematically represented by the airflow illustrated by an arrow in FIG. 1) and, optionally, any other parts subject to a temperature increase induced by the operation of the microwave source 110. The cooling unit 190 may for example comprise a fan associated with a motor and pipes for guiding air from the fan to the microwave source 110 or for circulating the air around the microwave source 110. The microwave heating apparatus 100 further includes a control unit 170 configured to control the cooling unit 190.

According to an embodiment, the control unit 170 may determine the need of cooling as a function of the efficiency of the microwave source 110. The cooling of the microwave source 110 via the cooling unit 190 is then adjusted or regulated accordingly. Several types of regulation of the cooling unit 190 may be envisaged. For the purpose of illustration, in a basic implementation with only two different levels of regulation of the cooling unit, the determined efficiency may be compared with a threshold and if the efficiency is above the threshold, the cooling system is operated at a first level and if the efficiency is below the threshold, the cooling system is operated at a second, higher than the first, level. In other embodiments, the cooling unit may be regulated based on a plurality of regulation levels. Further, the control unit 170 may include a lookup table correlating a specific efficiency with a specific regulation level, thereby providing a more sensitive control of the cooling (depending on the number of regulation levels included in the lookup table). The regulation may also be based on extrapolation of a regulation level even if the efficiency is not included in the lookup table, i.e. by extrapolation of an intermediate value between two subsequent values of the lookup table, thereby providing a more continuous type of regulation.

According to a first alternative, the control unit 170 may determine the efficiency of the microwave source based on a temperature time derivative. For this purpose, the microwave heating apparatus 100 may be equipped with a temperature sensor 180 arranged at or in proximity to, the microwave source 110. In this respect, the sensor 180 is preferably arranged directly at the anode outer mantle or on the radiator fin assembly used to cool down the microwave source (somewhat shielded behind the anode). The fan may then be arranged on the opposite side of the anode. The control unit 170 may then receive the temperature measurements from the temperature sensor 180 and by using a calculating or computing device to measure the power of microwaves. The calculating or computing devices can be a microprocessor or code stored within the memory system of a computer containing a processor where the code is capable of measuring the power of microwaves. The device is typically a directional coupler, (not shown), which calculates the temperature time derivative. The microwave heating apparatus 100 may then further include a clock (not shown) to track the time elapsed between two subsequent temperature measurements. The calculating device and the clock may be part of the control unit 170. However, it may also be envisaged that the calculating device and the clock are provided as separate entities or integrated in the temperature sensor 180 itself.

According to another alternative, the control unit 170 may determine the efficiency of the microwave source 110 based on the power level of the microwaves transmitted from the microwave source 110 to the cavity 130 and operational data indicative of the power supplied to the microwave source 110. For this purpose, the control unit 170 may be connected to a measuring device 140 adapted to measure the power of the microwaves transmitted in the transmission line 112 and a receiving device 150 adapted to receive and capable of receiving the operational data (e.g. the power supplied to the microwave source 110). The receiving device is typically linked to information about the power fed to the source itself. In the case of magnetron, this is, for example, the magnetron anode current. The magnetron anode current can be readily measured in the power supply feeding the magnetron either by using anode current data directly accessible in the case of an inventor or with an additional current clamp circuitry if a half-wave voltage doubler power supply is used.

For a magnetron, the efficiency may be determined as a function of the ratio between the measured power of the transmitted microwaves and the anode current of the magnetron 110 (wherein the anode current is representative of the power supplied to the magnetron 110). It will be appreciated that for microwave ovens provided with inverters for controlling the anode current of the magnetron, such information may be directly obtained, normally via the inverter, by the control unit 170. However, it is also contemplated to apply the present invention to microwave ovens not comprising any inverter and for which the anode current may be derived via e.g. an external current meter connected to the (anode of the) magnetron 110. Measurements of the anode current in microwave ovens provided with regular high voltage transformers is preferably performed "outside" the tube of the magnetron 110 itself, e.g. in the supply circuit.

In particular, in microwave ovens, the frequency of the microwaves varies as a function of the anode current (or as a function of a current from some power supply connected to the magnetron). Thus, if the anode current varies (for any reasons such as a change in output power from e.g. 900 W to 400 W), the oscillating frequency of the magnetron may vary (also refers to as the pushing factor), which may affect the efficiency of the magnetron. As the oscillation frequency is changed, the microwave source may then operate in sink phase. However, the pushing factor (i.e. a change in oscillating frequency because of a change in the average anode current) may also make the magnetron operate in anti-sink phase. The present invention takes care of the pushing factor in that the microwave heating apparatus 100 according to the present invention is configured to determine whether the efficiency of the microwave source 110 has changed and the cooling is regulated accordingly. Normally, if it is determined that the magnetron 110 operates in the sink phase (i.e. at relatively high efficiency), the cooling is decreased, and if it is determined that the magnetron 110 operates in anti-sink phase, the cooling is increased.

The microwave heating apparatus 100 may include additional measuring devices 145 configured to measure the power level of microwaves reflected back towards the microwave source 110. In FIG. 1, the measuring device 140 and the additional measuring device 145 are integrated in a single entity, typically a directional coupler. Generally, microwaves transmitted to a cavity may be either absorbed by a load arranged in the cavity, absorbed by elements of the cavity (or other objects present in the cavity), or reflected back from the cavity (or feeding port). Indeed, if the coupling to the cavity 130 is not perfect, some microwave power may be reflected, e.g. through a feeding port, back into the transmission line 120 towards the microwave source 110. An advantageous, and thus preferred, way to control whether there is a satisfactory coupling to the cavity 130, is by measuring the power that is reflected from a feeding port of the cavity 130. In the example schematically shown in FIG. 1, the power of the reflected microwaves may be measured at the extremity of the transmission line 120 which is closest to the cavity 130. The powers of the reflected microwaves are, at least partly, representative of the amount of microwaves absorbed by the load 138 arranged in the cavity 130.

According to an embodiment, the control unit 170 may determine the need of cooling as a function of the measured power of the reflected microwaves. In a basic implementation, the control unit 170 may be configured to set the cooling unit 180 at a first level of cooling capacity (e.g. using a first speed of the fan motor of the cooling unit) if the amount of reflected microwaves is below a predetermined threshold and at a second level of cooling, higher than the first level (e.g. using a higher speed of the fan motor), if the amount of reflected microwaves is above the predetermined threshold.

Further, the control unit 170 may be configured to set the cooling level in accordance with the reflection coefficient (obtained by the ratio of the measured power level of the reflected microwaves and the measured power level of the transmitted microwaves) wherein a first cooling level may be set for a first range of reflection coefficients, e.g. between 0.5 and 0.7, a second cooling level may be set for a second range of reflection coefficients, e.g. between 0.7 and 0.9 and a third cooling level may be set for a third range of reflection coefficients, e.g. between 0.9 and 0.99. Advantageously, in the present example, the strength of the cooling increases from the first to the third cooling levels such that the microwave source 110 is more strongly cooled down for high reflection coefficients.

Further, in accordance with further embodiments of the present invention, the control unit 170 may be configured to control the cooling based on a combination of the efficiency of the microwave source (either determined via the temperature time derivative or via the measured power level of the transmitted microwaves) and the heating efficiency as determined by the measured power level of the reflected microwaves.

Figure 2:
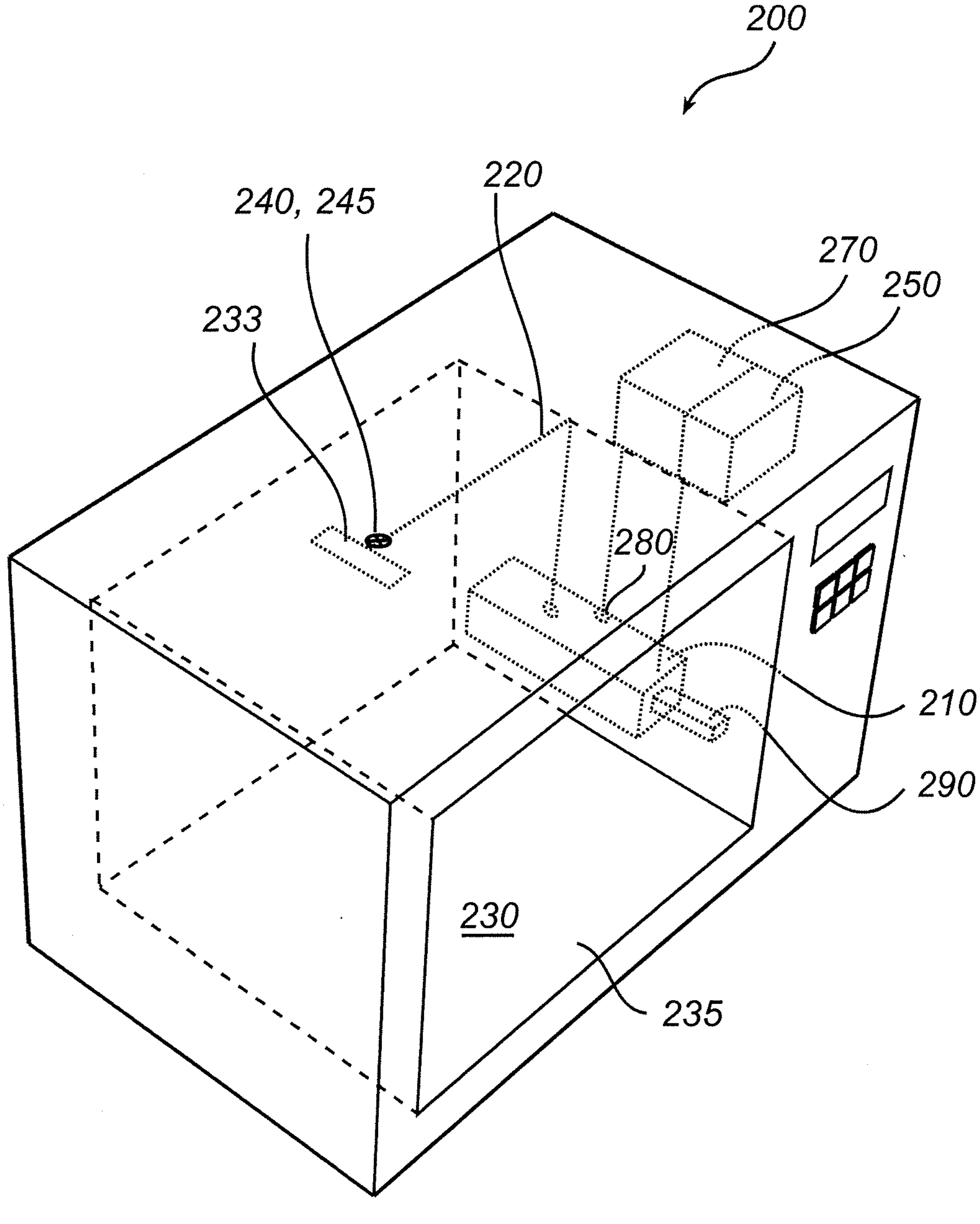
FIG. 2 schematically shows a microwave heating apparatus according to another embodiment of the present invention.

With reference to FIG. 2, there is shown a microwave heating apparatus 200, e.g. a microwave oven, having features and functions according to an embodiment of the present invention.

The microwave oven 200 comprises a cavity 230 defined by an enclosing surface. One of the side walls of the cavity 230 may be equipped with a door 235 for enabling the introduction of a load, e.g. food, in the cavity 230. Further, the cavity 230 may be provided with a feeding port (or antenna) 233 through which microwaves are fed to the cavity 230 of the microwave oven 200. The feeding port may for instance be an antenna, such as a patch antenna or a H-loop antenna, or even an aperture in a wall (including sidewalls, the bottom and the ceiling) of the cavity 230. In the following, reference is made to the term "feeding port".

The microwave oven 200 further typically includes a microwave source 210, e.g. a magnetron, connected to the feeding port 233 of the cavity 230 by a transmission line or waveguide 220. The transmission line 220 may for instance be a coaxial cable.

Further, the microwave oven 200 may include a first measuring unit (or measuring means) 240 for obtaining, or being adapted to obtain, a signal representative of the power transmitted from the microwave source 210.

Further, the microwave oven 200 may also include a second measuring unit (or measuring means) 245 for obtaining, or being adapted to obtain, a signal representative of the reflected from the cavity 230 at the feeding port 233. The first measuring device 240 and the second measuring device 245 may e.g. be arranged at the feeding port 233, such as depicted in FIG. 2.

Further, the microwave oven 200 may include a receiving device 250 (as discussed above in the context of FIG. 1) adapted to receive operational data (i.e. information) indicative of the power supplied to the microwave source 210.

Further, the microwave oven 200 may include a temperature sensor 280 arranged at or near the microwave source 210 for measuring the temperature of the microwave source. For example, the temperature sensor may be arranged directly at the source (i.e. the anode) or at a heat sink (not shown and usually used to more efficiently cool down the microwave source) of the microwave source 210.

Further, the microwave oven 200 includes a control unit 270 operatively connected to the first measuring unit 240, the second measuring unit 245, the receiving device 250 and the temperature sensor 280. The result of the measurements performed by the first measuring unit 240, the second measuring unit 245, the temperature sensor 280 and the information received by the receiving device 250 are transmitted to the control device or unit 270. The control unit 270 is then configured to determine the need of cooling based on either the efficiency of the microwave source 210, the measured level of the microwaves reflected back towards the microwave source 210 or a combination of both such information. The control unit is then configured to control a cooling unit 290 for cooling the microwave source 210 accordingly.

Either one, or both, of the first measuring unit 240 and the second measuring unit 245 may be integrated as sub-units in the control unit 270. Alternatively, the measuring units 240 and 245 may be arranged as separate units connected to the control unit 270. For example, the sensing part(s) of the first measuring unit 240 and the second measuring unit 245 may be a probe comprising a field-sensor at its extremity for sensing the energy transmitted to or reflected from the cavity, respectively. As another example, the first measuring unit 240 and the second measuring unit 245 may be a directional coupler arranged in proximity to the feeding port 233 and in proximity to, or in connection with, the transmission line 220 connecting the microwave source 210 with the feeding port 233.

It will be appreciated that the receiving device 250, although it is represented as a separate entity in FIG. 2, may be an integrated part of either one of the microwave source 210 or the control unit 270.

Further, the respective powers of the transmitted and/or the reflected microwaves may be measured by the measuring units 240 and 245 at various time points during an operation cycle (for instance used for heating a load arranged in the cavity) of the microwave heating apparatus 200 and the cooling of the microwave source is regulated in accordance with any one of the above described embodiments. It is therefore contemplated that the first and second measuring units 240 and 245 may be adapted to, continuously or periodically, monitor the signals representative of the powers of the transmitted and reflected microwaves in order to dynamically determine the heating efficiency and thereby dynamically regulate the cooling of the microwave source during an operation cycle accordingly. For the synchronization of the power measurements in relation to, or within, the operation cycle, the microwave oven 200 may further include a clock system (not shown).

Any of the embodiments described above with reference to FIG. 1 for determining the efficiency of the microwave source 110 is applicable to the microwave heating apparatus described with reference to FIG. 2.

Figure 3:
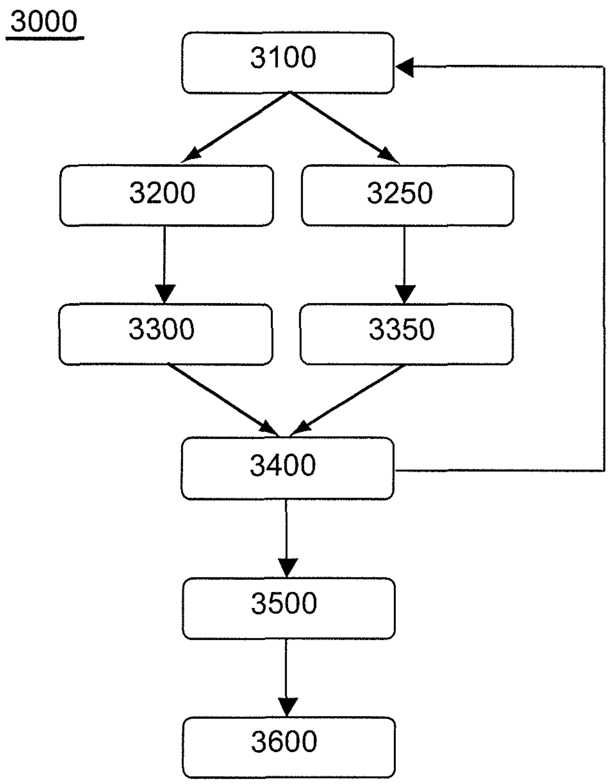
FIG. 3 is a general outline of a method of controlling cooling of a microwave source in a microwave heating apparatus in accordance with embodiments of the present invention.

With reference to FIG. 3, a method 3000 of controlling cooling of a microwave source in a microwave heating apparatus is described in accordance with exemplifying embodiments of the present invention.

The method starts at step 3100 wherein the control unit may be in idle mode and waiting before starting the process. The process may be run on a periodic basis according to a specific time interval.

According to a first alternative, the method includes the step of detecting 3200 the temperature of the microwave source and the step of calculating 3300 the temperature time derivative based on, in part, the detected temperature. The method then includes the step of determining 3400 the efficiency of the microwave source based on the calculated temperature time derivative.

According to a second alternative, the method includes the step of measuring 3250 the power of microwaves transmitted from the microwave source and the step of receiving 3350 operational data indicative of the power supplied to the microwave source. The method then includes the step of determining 3400 the efficiency of the microwave source based on the measured power of the transmitted microwaves and the received operational data.

Optionally, the method may further include the step of measuring 3500 the power of microwaves reflected back to the microwave source.

The cooling is then controlled at step 3600 based on either the determined efficiency of the microwave source or a combination of the determined efficiency of the microwave source and the measured power of the reflected microwaves.

It will be appreciated that any one of the embodiments described above for the first and second aspects of the present invention with reference to FIGS. 1 and 2 is combinable and applicable to the method described herein with reference to FIG. 3.

Figure 4:
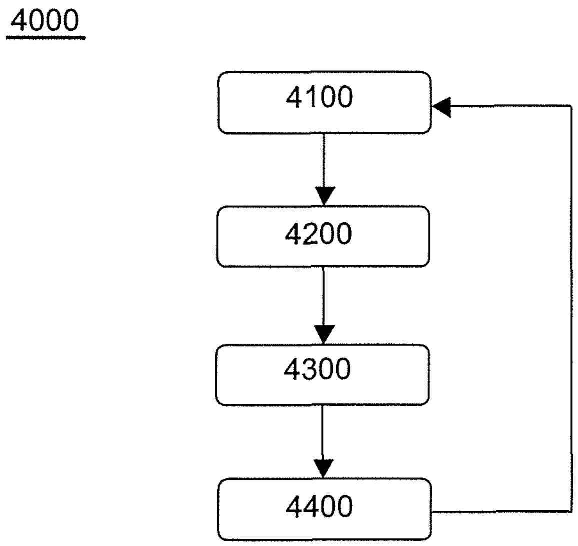
FIG. 4 is a general outline of a method of controlling cooling of a microwave source in a microwave heating apparatus in accordance with another embodiment of the present invention.

With reference to FIG. 4, a method 4000 of controlling cooling of a microwave source in a microwave heating apparatus comprising a transmission line via which microwaves generated by the microwave source are transmitted to a cavity is described in accordance with other exemplifying embodiments of the present invention.

The method starts at step 4100 wherein the control unit may be in idle mode and waiting before starting the process. The process may be run on a periodic basis according to a specific time interval.

The method includes the step of measuring 4200 the power of microwaves reflected back to the microwave source. Optionally, the method may also include the step of measuring 4300 the power of microwaves transmitted from the microwave source.

The method then further includes the step of controlling 4400 the cooling based on the measured power of the reflected microwaves or a combination of the measured power of the reflected microwaves and the measured power of the transmitted microwaves (for example for computation of the reflection coefficient).

It will be appreciated that any one of the embodiments described above for the third aspect of the present invention with reference to FIGS. 1 and 2 is combinable and applicable to the method described herein with reference to FIG. 4.

Further, it will be appreciated that in the methods described with reference to FIG. 3 or 4 the measurements (of the power levels and the temperature) and the regulation of the cooling are advantageously performed at a sufficient rate such that the cooling is adapted to any sudden changes, in particular in efficiency of the microwave source.

The present invention is applicable for domestic appliances such as an oven, or more typically, a microwave oven using microwaves for heating. The present invention is also applicable for larger industrial appliances found in e.g. food operation. The present invention is also applicable for vending machines or any other dedicated applicators.

While specific embodiments have been described, the skilled person will understand that various modifications and alterations are conceivable within the scope as defined in the appended claims.

For example, the steps of the method described with reference to FIG. 4 may be performed in another order than that described above, in particular for steps 3200-3350 and for steps 4200 and 4300.

It will be appreciated that the present invention is not limited to any specific range of frequencies for operation of the microwave heating apparatus. The present invention is therefore applicable for any standard microwave sources having mid-band frequencies of 915 MHz, 2450 MHz, 5800 MHz and 22.125 GHz.

Further, it will be appreciated that the present invention is not limited to a microwave source being a magnetron. The microwave source may for example be a solid state microwave generator (or semiconductor-based microwave generator) including e.g. a varactor diode (having a voltage-controlled capacitance).

Although a microwave heating apparatus including only one microwave source has been described above, it is also envisaged to apply the present invention to microwave heating apparatus including a plurality of microwave sources. The microwave sources may then be cooled down by use of a centralized cooling unit (connected to the microwave sources by a piping structure in order to provide cooled air to each of the microwave sources) or individual cooling units for one microwave source or a subgroup of microwave sources.

What is claimed is:

1. A microwave heating apparatus comprising:
a microwave source for generating microwaves;
a cooling unit for cooling the microwave source;

a control unit configured to determine efficiency of the microwave source and control the cooling unit based on the determined efficiency;
a sensor for detecting the temperature of the microwave source; and
a calculating device that calculates a temperature time derivative based on, in part, the detected temperature of the microwave source;
wherein the determined efficiency of the microwave source is based on the calculated temperature time derivative.

2. The microwave heating device of claim 1 further comprising:
a transmission line for transmitting the generated microwaves from the microwave source to a cavity;
a measuring device that measures the power of microwaves transmitted from the microwave source; and
a receiving device that receives operational data indicative of the power supplied to the microwave source;
wherein the control unit is configured to further determine the efficiency of the microwave source based on the measured power of the transmitted microwaves and the received operational data.

3. The microwave heating apparatus of claim 2, wherein the control unit is configured to control the cooling unit as a function of the ratio between the measured power of the transmitted microwaves and the power supplied to the microwave source.

4. The microwave heating apparatus of claim 3, wherein the microwave source is a magnetron and the operational data is the anode current of the magnetron.

5. The microwave heating apparatus of claim 4, wherein the control unit is configured to control the speed of a fan motor arranged in the cooling unit for cooling the microwave source.

6. The microwave heating apparatus of claim 2, wherein the microwave source is a magnetron and the operational data is the anode current of the magnetron.

7. The microwave heating apparatus of claim 2, wherein the microwave source is a solid-state microwave generator.

8. The microwave heating apparatus of claim 7, wherein the control unit is configured to control the speed of a fan motor arranged in the cooling unit for cooling the microwave source.

9. The microwave heating apparatus of claim 1, wherein the microwave source is adapted to feed microwaves to a cavity of the microwave heating apparatus via a transmission line, the apparatus further comprising:
measuring device that measures the power of microwaves reflected back to the microwave source;
wherein the control unit is configured to control the cooling unit based on the measured power of the reflected microwaves and the determined efficiency of the microwave source.

10. The microwave heating apparatus of claim 1, wherein the control unit is configured to control the speed of a fan motor arranged in the cooling unit for cooling the microwave source.

11. The microwave heating apparatus of claim 1, wherein the control unit is configured to increase the cooling to at least a first level if the microwave source is determined to operate in an anti-sink phase and to decrease the cooling to at least a second lower level if the microwave source is determined to operate in a sink phase.

* * * * *